(12) United States Patent
Sun

(10) Patent No.: US 10,140,475 B2
(45) Date of Patent: Nov. 27, 2018

(54) FORENSIC COMPUTER EXAMINATION SYSTEMS AND METHODS

(71) Applicant: David Sun, Great Falls, VA (US)

(72) Inventor: David Sun, Great Falls, VA (US)

( * ) Notice: Subject to any disclaimer, the term of this patent is extended or adjusted under 35 U.S.C. 154(b) by 372 days.

(21) Appl. No.: 14/210,766

(22) Filed: Mar. 14, 2014

(65) Prior Publication Data

US 2014/0281320 A1     Sep. 18, 2014

Related U.S. Application Data

(60) Provisional application No. 61/802,841, filed on Mar. 18, 2013.

(51) Int. Cl.
| | |
|---|---|
| *G06F 9/455* | (2018.01) |
| *G06F 12/00* | (2006.01) |
| *G06F 21/64* | (2013.01) |
| *G06F 21/53* | (2013.01) |
| *G06F 21/57* | (2013.01) |

(52) U.S. Cl.
CPC .............. *G06F 21/64* (2013.01); *G06F 21/53* (2013.01); *G06F 21/575* (2013.01)

(58) Field of Classification Search
CPC ......... G06F 21/64; G06F 21/53; G06F 21/575
USPC .......................................................... 726/2
See application file for complete search history.

(56) References Cited

U.S. PATENT DOCUMENTS

| | | | |
|---|---|---|---|
| 2007/0016800 A1* | 1/2007 | Spottswood | G06F 21/78 713/193 |
| 2007/0168455 A1* | 7/2007 | Sun | G06F 21/6209 709/217 |
| 2011/0191533 A1* | 8/2011 | Coulter | G06Q 10/00 711/112 |
| 2013/0339958 A1* | 12/2013 | Droste | G06F 21/41 718/1 |

FOREIGN PATENT DOCUMENTS

WO    WO 2012154658 A2 * 11/2012 .............. G06F 21/50

\* cited by examiner

*Primary Examiner* — Alexander Lagor
(74) *Attorney, Agent, or Firm* — Terry M. Sanks, Esq.; Beusse Wolter Sanks & Maire, PLLC

(57) ABSTRACT

Systems, methods, and computer program products for facilitating write-protected virtual access to a target computing device, wherein the use and inspection of the computer device may occur without altering the digital data thereon, are disclosed. In an aspect, a user inserts a virtualization media device, which will boot the computer system in a write-protected mode. The computing device will operate through an operating system on the target computing device and instantiate the subject computer through a virtual machine environment. Such virtualization will protect target computing device files from accidental alteration during, for example, investigatory searches of the target computing device storage device.

27 Claims, 8 Drawing Sheets

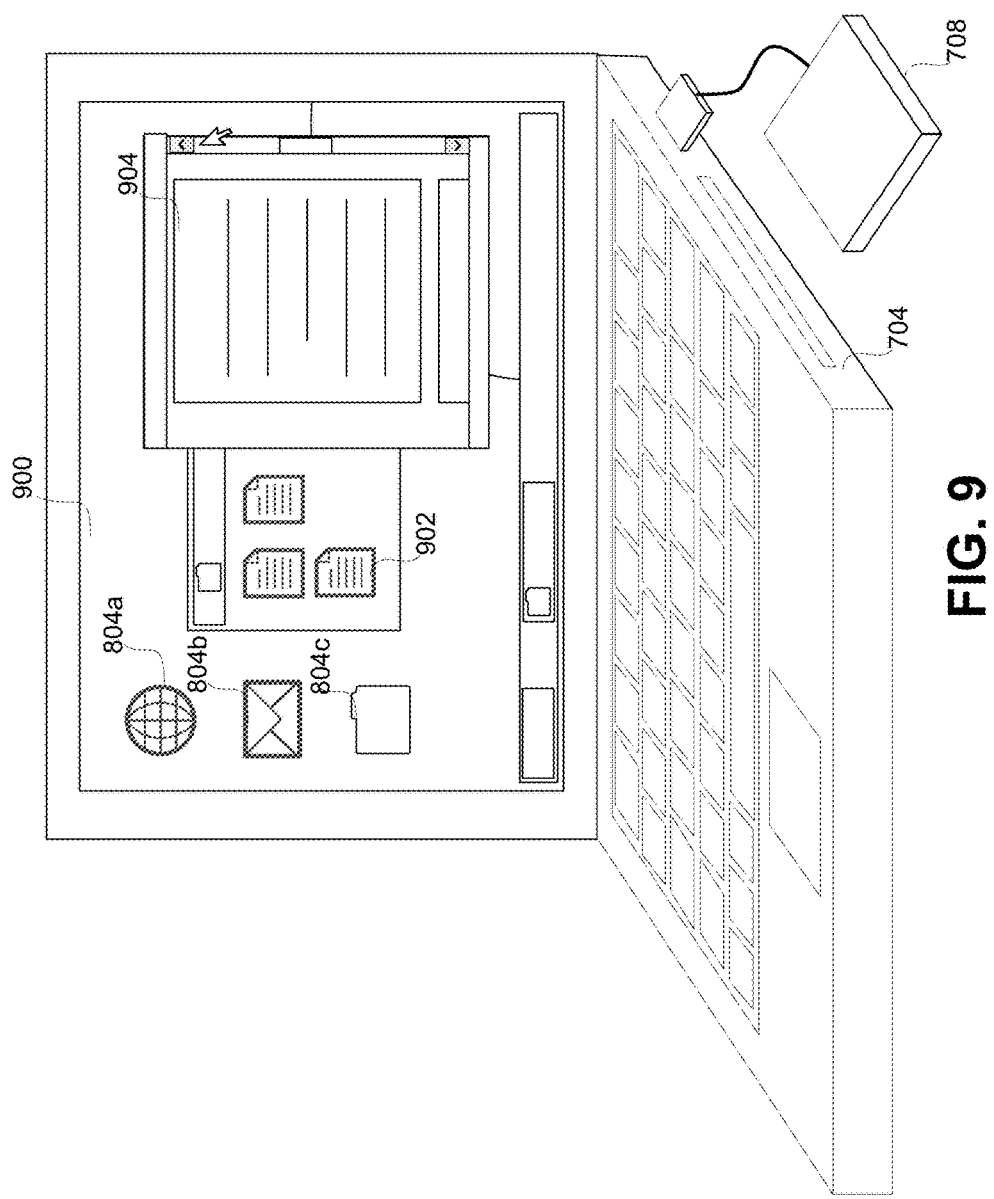

FORENSIC COMPUTER EXAMINATION SYSTEMS AND METHODS

CROSS-REFERENCE TO RELATED APPLICATION

This application claims the benefit of U.S. Provisional Patent Application No. 61/802,841, filed Mar. 18, 2013, and entitled "Forensic Computer Examination System," the entire contents of which is incorporated herein by reference.

FIELD OF THE DISCLOSURE

The present disclosure generally relates to computer forensics, electronic discovery, computer investigations and more particularly to systems, methods, and computer program products for protecting and preserving evidence while conducting investigatory searches on computer systems.

BACKGROUND

In order to maximize admissibility in court proceedings, evidence collected in an investigation must not be damaged, destroyed, or altered from the time that it is identified as evidence to the time that it is presented to the court. While paper evidence may be easily damaged or destroyed, there is not a great concern that the information and data found within a paper document can be altered. That is, the information found on the paper itself is not subject to change. The information and data on the paper today will be the same tomorrow, next week, next month, or next year, so long as the paper is properly preserved. This is not the case, however, with digitally-stored data.

Without the proper precautions and due care, digitally stored data is extremely easy to alter. Such an alteration can be unintentional and can be caused during an investigation. For example, time and date stamps indicating the last time a file was opened can be unintentionally altered, as well as a start-up or shut-down sequence designed by the owner to erase the computer's hard drive may be unintentionally activated, thereby destroying the usefulness of a confiscated computer.

As of today, for a computer investigator to forensically examine a computer, the computer first has to be processed and a forensic image should be created. The forensic image is then examined using a different computer. This methodology, however, does not provide the investigator with a "first person" perspective of the computer usage. That is, the full experience that a user of the original computer may have is not replicated through an external examination of the hard drive. In addition, the need to create the forensic image before examination to preclude the possibility of modifying of the original drive contents can add considerable time and expense to any investigation.

Given the foregoing, what is needed are systems, methods, and computer program products for facilitating the use of a computer system that can occur without altering the digital data on said computer system.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present disclosure meets the above-identified needs by providing systems, methods, and computer program products for facilitating the examination of a computer system that can occur without altering the digital data on said computer system.

In an aspect of the present disclosure, a user utilizes a specialized media disk, which may be a CD-ROM, a USB flash drive, or any other media disk capable of holding a tool program in accordance with the present disclosure, which can be inserted or attached to the subject computer. Said tool allows the user to run a separate operating system, such as the Linux OS on the subject computer and the separate operating system loads a virtualization layer which utilizes the computer's hard drive and operates it as a virtual machine while any responsive data (e.g., files, fragments, or screenshots) found thereon can be saved onto the inserted or attached disk or other temporary storage device communicatively coupled to the target computing device. In some aspects, the temporary storage device contains the tool program.

In another aspect, the system of the present disclosure utilizes techniques already known in the field in order to bypass password protected user accounts on the subject computer. In such an aspect, available industry techniques will be used to reset or bypass the administrator and all other user passwords and will provide the investigator a list of all accounts on the system. This will allow the investigator to access a previously password-protected system that the user would have otherwise been unable to access.

In yet another aspect, various third-party forensic software applications are pre-installed with the tool and available as part of the examination. Said forensic software applications can then be used to search the computer rather than the investigative user performing the search manually.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

FIG. 9 is an illustration depicting a target computing device during a forensic analysis session, wherein a file found on the target computing device is accessed in a write-protected mode, according to various aspects of the present disclosure.

DETAILED DESCRIPTION

The present disclosure is directed to systems, methods, and computer program products for protecting and preserving evidence while conducting investigatory searches on computer systems. In various aspects, the present disclosure provides systems, methods, and computer program products to allow an investigative user to use a computer system without altering the digital data on said computer system.

In one aspect, the disclosure is directed toward one or more computer systems capable of carrying out the functionality described herein. An example of a computer system 100 is shown in FIG. 1.

Figure 1:
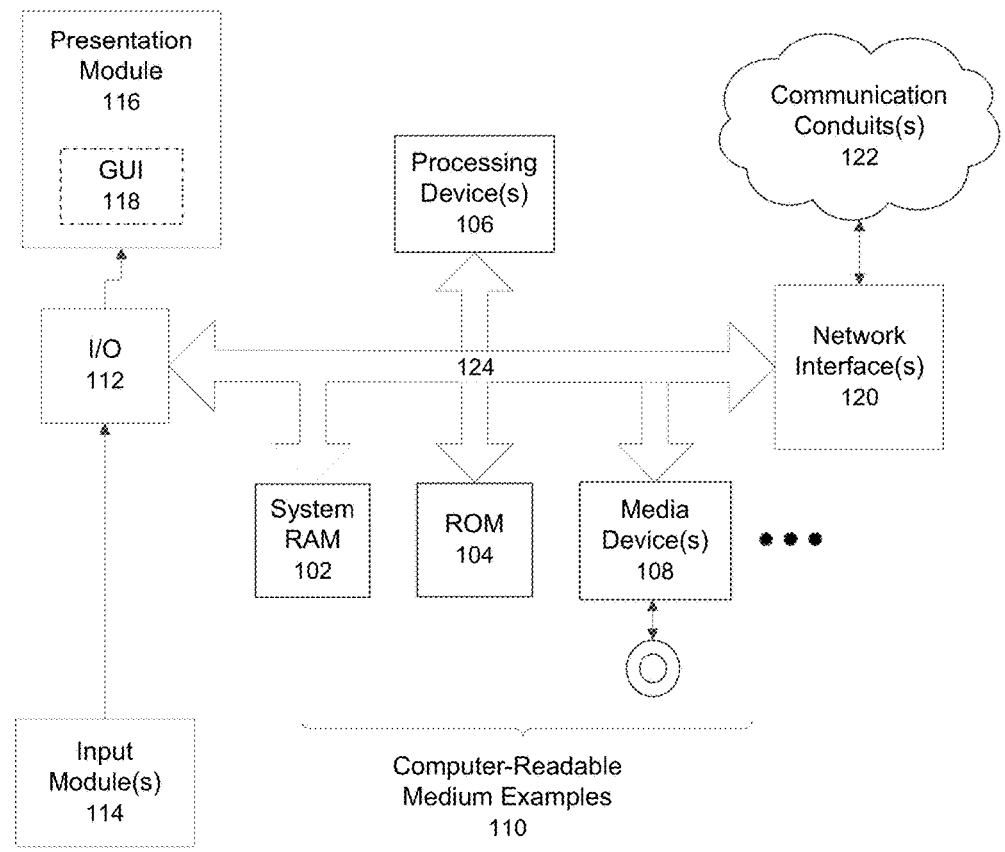
FIG. 1 is a block diagram of an exemplary computer system useful for implementing aspects of the present disclosure.
Figure 1:

FIG. 1 shows a block diagram of an exemplary computer system useful for implementing various aspects of the processes disclosed herein, in accordance with one or more aspect of the present disclosure. FIG. 1 sets forth illustrative computing functionality 100 that process 200 may be implement upon in one or more aspects of the present disclosure, which in all cases represents one or more physical and tangible processing mechanisms.

Computing functionality 100 may comprise volatile and non-volatile memory, such as RAM 102 and ROM 104, as well as one or more processing devices 106 (e.g., one or more central processing units (CPUs), one or more graphical processing units (GPUs), and the like). Computing functionality 100 also optionally comprises various media devices 108, such as a hard disk module, an optical disk module, and so forth. Computing functionality 100 may perform various operations identified above when the processing device(s) 106 execute(s) instructions that are maintained by memory (e.g. RAM 102, ROM 104, and the like).

More generally, instructions and other information may be stored on any computer readable medium 110, including, but not limited to, static memory storage devices, magnetic storage devices, and optical storage devices. The term "computer readable medium" also encompasses plural storage devices. In all cases, computer readable medium 110 represents some form of physical and tangible entity. By way of example, and not limitation, computer readable medium 110 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 102, ROM 104, EEPROM, Flash memory, or other memory technology; CD-ROM, digital versatile disks (DVD), or other optical storage; magnetic cassettes, magnetic tape, magnetic disk storage, or other magnetic storage devices; or any other medium that can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 100 may also comprise an input/output module 112 for receiving various inputs (via input modules 114) and for providing various outputs (via one or more output modules). One particular output module mechanism may be a presentation module 116 and an associated GUI 118. Computing functionality 100 may also include one or more network interfaces 120 for exchanging data with other devices via one or more communication conduits 122. In some aspects, one or more communication buses 124 communicatively couple the above-described components together.

Communication conduit(s) 122 may be implemented in any manner (e.g., by a local area network, a wide area network (e.g., the Internet), and the like, or any combination thereof). Communication conduit(s) 122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

Figure 2:
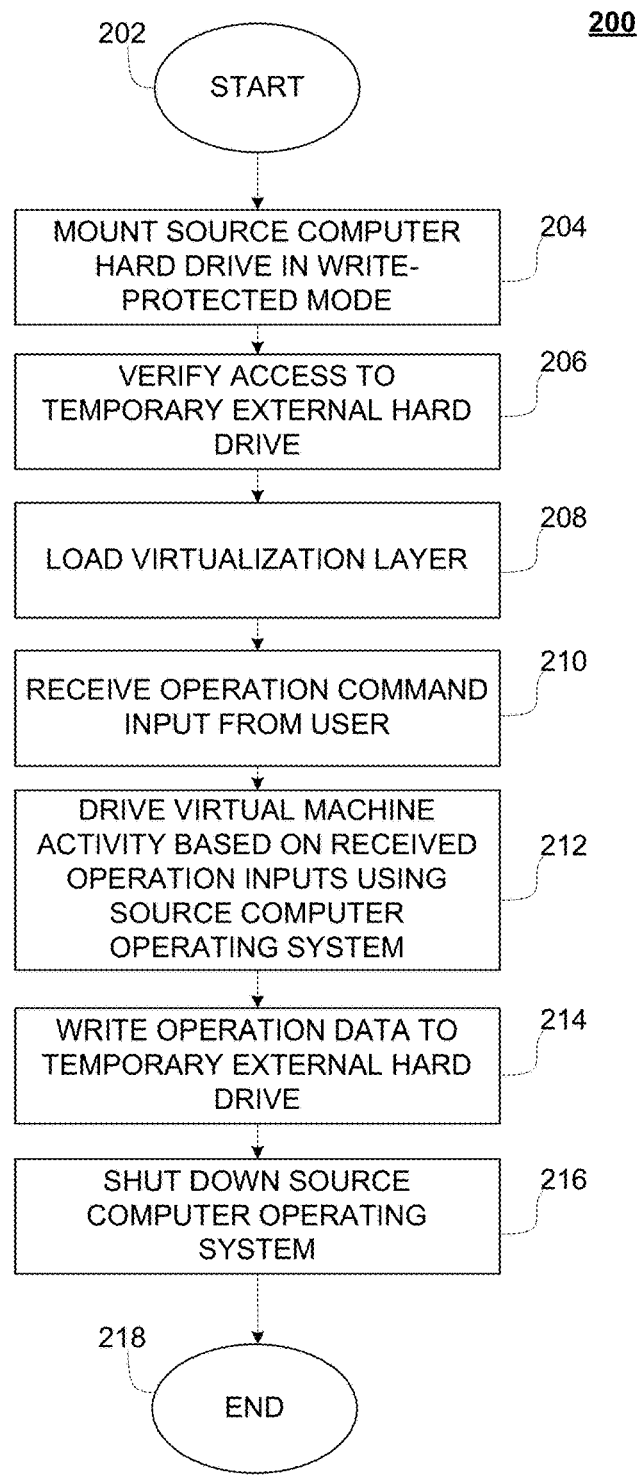
FIG. 2 is a flowchart illustrating an exemplary process for facilitating forensic access of a target computing device, according to an aspect of the present disclosure.

Referring to FIG. 2, a flowchart of a process 200 for facilitating forensic access of a target computing device, according to an aspect of the present disclosure, is shown.

Process 200 may execute within a system comprising a target computing device and an external storage device. The external storage device comprises a forensic access tool. The forensic access tool facilitates access and viewing of the contents of the target computing device in a write-protected mode, thereby facilitating in-situ forensic study of the target computing device in a manner suitable for criminal and civil investigations, private investigations, clandestine access, scientific study, and other situations where access is required which cannot alter the contents of the target computing device. In some aspects, the forensic access tool creates a forensic image of the target computing device storage device on, for example the external storage device. In another aspect, the forensic analysis tool is also configured to expose deleted files within the target computing device. In an aspect, the forensic access tool may capture and analyze network traffic emanating from the target computing device. In yet another aspect, the forensic access tool captures screenshots and video recording of the target computing device as it is being operated or otherwise accessed.

In another aspect, process 200 executes within a system comprising a target computing device a forensic access tool located on a remote computing device and a remote storage device for utilization during forensic access of the target computing device. The remote computing device and the remote storage device may be communicatively coupled to the target computing device via a network, such as the global, public Internet, an access-controlled local area network, or the like.

Processes 300, 400, 500 and 600 may be executed within systems identical to or similar to those described above with respect to process 200. As will be apparent to those skilled in the relevant art(s) after reading the description herein, such processes may be utilized in other systems and for other purposes. Further such systems may be combinations of the systems described above.

Process 200 begins at step 202 with control passing immediately to step 204.

At step 204, a target computing device hard drive is mounted in write-protected mode. Mounting is facilitated by commands sent from the forensic access tool. In another aspect, mounting is facilitated by a third-party program. In another aspect, mounting is facilitated by a user action such as connecting or disconnecting pins on one or more hard drives of the target computing device via a jumper, actuating a write-protect switch, and the like.

At step 206, connection or access to a temporary storage device is verified. The storage device may be an external device such as an external hard drive, a USB flash drive, or the like. In one aspect, the storage device is a bootable temporary external hard drive which would contain the tool program, a separate computer operating system (if necessary), as well as any other needed computer program (e.g., computer forensics software). In another aspect, the device containing the forensic access tool and the storage device may be separate. Where access is not verified, a user may be prompted to connect the storage device before proceeding (see FIG. 7, described below).

At step 208, a virtualization layer is loaded, wherein virtualization layer may utilize the target computer's hard drive and create a host environment for a virtual machine.

At step 210, an operation command, such as a mouse click, is received from a user.

At step 212, the target computer operating system is utilized to drive virtual machine activity based on received operation inputs, thereby using the target computing device's resources to facilitate forensic study of the target computing device. Such usage allows a user to experience the target computing device as its owner would and minimizes the risk of corrupted data or lost data due to copying the target computing device hard drive. Thus process 200 provides a more complete forensic analysis and better preserves and facilitates access to data on the target computing device.

At step 214, operation data is written to the temporary storage device where operation data may result from utilization of the target computing device operating system. Directing operation data to temporary storage device protects the hard drive of the target computing device from alterations caused by the user's investigative actions. The user may also copy information found on the target computing device to the temporary storage device or send such information to another storage device via the computing devices resources (e.g., email files found on target computing device to a third party, upload files to a cloud-based storage service).

At step 216, target computing device operating system is shut down, thereby ending the forensic analysis session.

Process 200 terminates at step 218.

Figure 3:
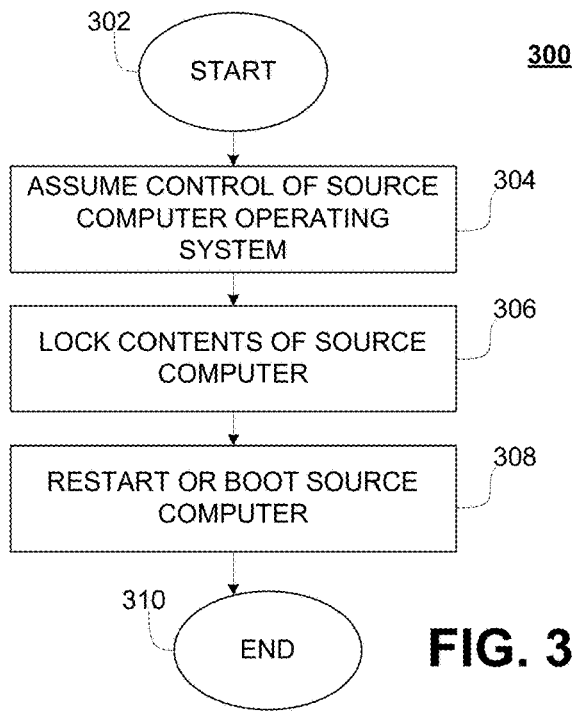
FIG. 3 is a flowchart illustrating an exemplary process for facilitating write-protecting the contents of a target computing device, according to an aspect of the present disclosure.

Referring to FIG. 3, a flowchart of a process 300 for facilitating write-protecting the contents of a target computing device in order to facilitate write-protected access to the target computing device, preserve it for later evidentiary use, or the like, according to an aspect of the present disclosure, is disclosed. Process 300 may precede or be otherwise integrated into process 200.

Process 300 begins at step 302 with control passing immediately to step 304. At step 304, control over the target computing device operating system is assumed by the forensic access tool, or by another module or user. At step 306, the condition of the target computing device operating system is locked. In some aspects, the condition (e.g., the data and arrangement of target computer operating system or storage device) may optionally be stored in temporary external storage device. As used herein, condition refers to a formal state, including attributes like open browser pages, open programs with unsaved work, or open instant messaging conversations. In such aspects, locking the condition at step 306 allows a target computing device accessing system to boot a virtual machine to the same condition, including the open actions. In some aspects, temporary data may be "dumped" when the target computing device is shut down. Accordingly, it may be necessary to preserve temporary data relevant to reestablishing the condition prior to restarting the target computing device.

At step 308, the target computing device is restarted. Process 300 terminates at step 312. Process 300 may be particularly significant where the target computing device is initially accessed or otherwise collected in an "on" state, which may lead to lost, tampered, or corrupted evidence if the target computing device is restarted.

Figure 4:
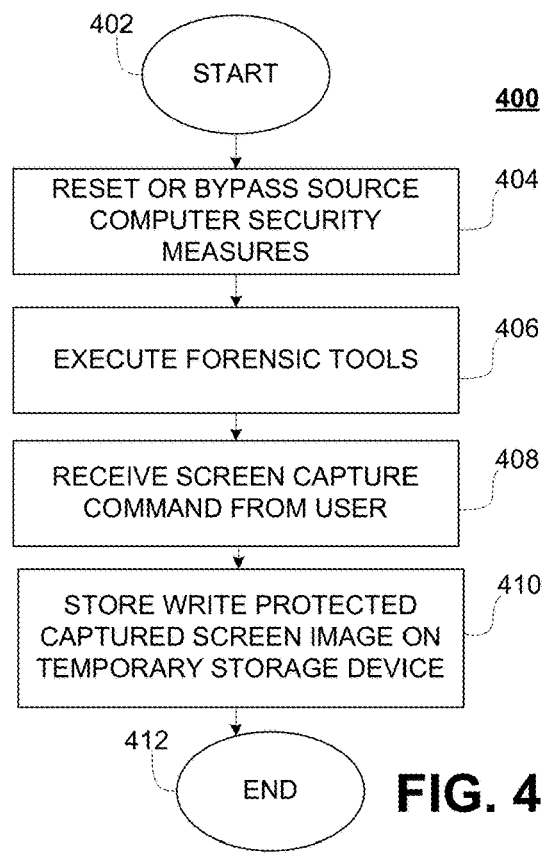
FIG. 4 is a flowchart illustrating an exemplary process for facilitating access to a target computing device, according to an aspect of the present disclosure.

Referring now to FIG. 4, a flowchart of a process 400 for facilitating access to a target computing device, according to an aspect of the present disclosure, is shown. Process 400 may be integrated with the steps of process 200.

Process 400 begins at step 402 with control passing immediately to step 404. At step 404, security measures on one or more the hard drives, operating systems, programs, files and the like are bypassed or reset. Where the security measures are reset, temporary passwords may be created, using industry available techniques, while the passwords on the target computing device remain unaltered.

In other aspects, security measures may be removed. However, removal may be considered a manipulation or alteration of the hard drive or operating system of the target computing device, which may not be preferable in some circumstances, such as criminal investigations. In aspects where forensic tools may be included on write-protected accessing system or temporary storage device, at step 406, forensic tools may be executed. In some aspects, at step 408, a screen capture command may be received, and at step 410, a captured screen image may be stored on the temporary storage device. Process 400 terminates at step 412.

In some aspects, forensic tools may allow for a quick preliminary assessment of contents on a target computing device, which may not require extensive user interaction. Performing said assessment on a multitude of target computing devices may allow for forensic "triage" that would guide an allocation of resources to those target computing devices with the most or most significant evidence, based on preprogrammed criteria. Similarly, forensic tools may be able to more effectively locate relevant files and information on the target computing device than would a user manually navigating the virtual machine.

Figure 5:
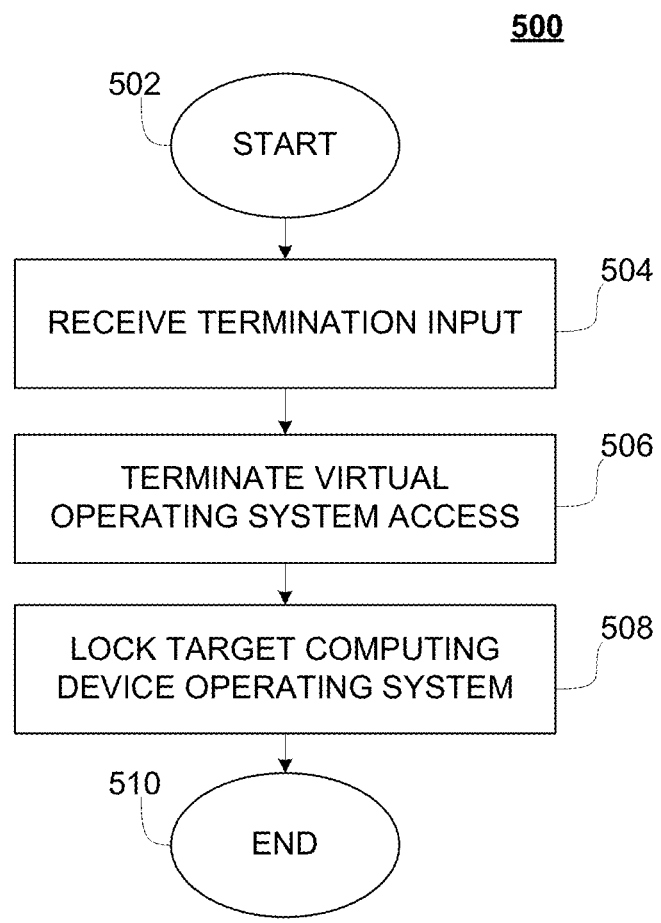
FIG. 5 is a flowchart illustrating an exemplary process for ending a forensic access session for a target computing device wherein the computing device is write-protected, according to an aspect of the present disclosure.

Referring to FIG. 5, a flowchart of a process 500 for ending a forensic access session for a target computing device wherein the computing device is write-protected, according to an aspect of the present disclosure, is shown.

Process 500, begins at step 502 with control passing immediately to step 504.

At step 504, a termination command is received. At step 506, user access to virtual machine is terminated. At step 508, the target computing device operating system is locked, preventing booting the target computing device without utilizing a write-protected access system. Process 500 terminates at step 510.

Figure 6:
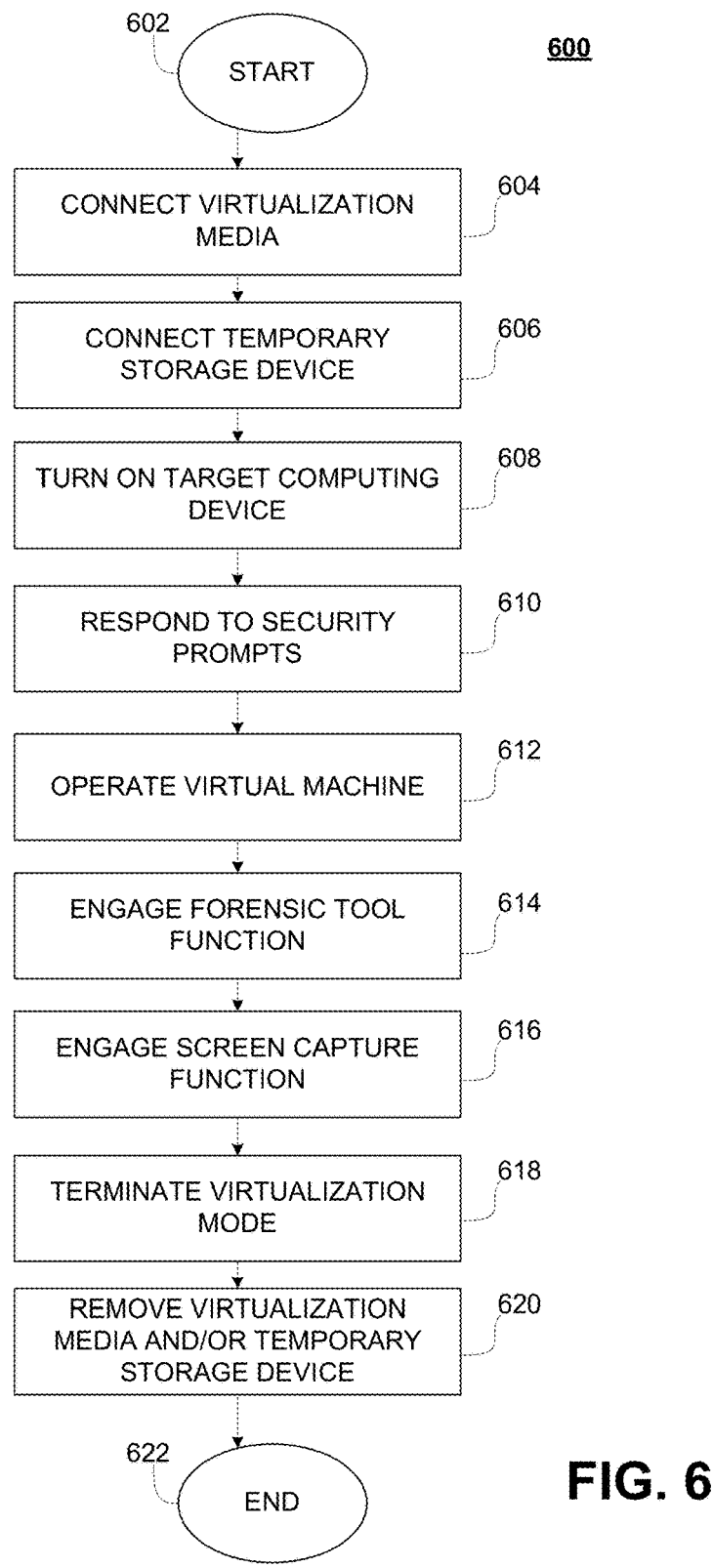
FIG. 6 is a flowchart illustrating an exemplary process for facilitating forensic access of a target computing device, according to an aspect of the present disclosure.

Referring to FIG. 6, a flowchart of a process 600 for facilitating forensic access of a target computing device, according to an aspect of the present disclosure, is shown.

Process 600 begins at step 602 with control passing immediately to step 604. At step 604, virtualization media, such as a CD-ROM or flash drive, is inserted into the target computing device or otherwise connected for communication to the target computing device.

The virtualization media contains a tool program according to the present disclosure, a separate computer operating system, as well as any other needed computer program (e.g., computer forensics software). In one aspect, such computer program would be a network packet sniffer, such as Wireshark (available from the Wireshark Foundation of www-.wireshark.org) or Encase Forensic (available from Guidance Software, Inc. of Pasadena, Calif.), which would be utilized to monitor computer network traffic to/from the target computing device without the need of the user to perform any manual data capture and decoding or recover forensic data on the hard drive. As will be apparent to those skilled in the relevant art(s) after reading the description herein, such an aspect is exemplary, rather than a limitation, and many other programs can be utilized herein At step 606, a temporary storage device is connected. In some aspects, virtualization media may comprise the temporary storage device, and steps 604 and 606 may be combined. At step 608, target computing device is turned on or restarted. As described in process 300, in some aspects step 608 occurs without user action.

At step 610, a response to an authorization or identification prompt is required. In some aspect, step 610 is omitted. At step 612, virtual machine is operated as would target computing device. At step 614, a forensic tool function is selected to execute on target computing device. At step 616, screen capture function is commanded to execute, thereby collecting potentially relevant data. At step 618, virtualization mode is terminated, and at step 620, virtualization media and/or temporary storage device is removed. Process 600 terminates at step 622.

Figure 7:
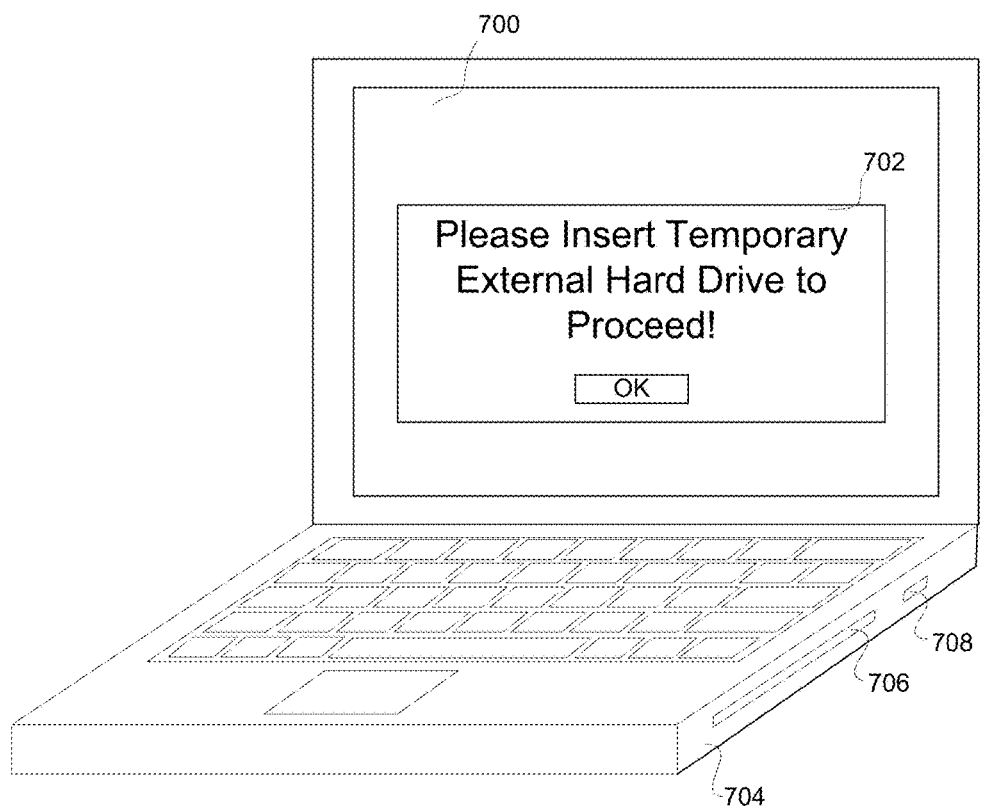
FIG. 7 is an illustration depicting a target computing device displaying a message prompting a user to attach an external storage device for utilization during a forensic analysis of the target computing device, according to various aspects of the present disclosure.

Referring to FIG. 7, an illustration depicting a target computing device 704 displaying, via a GUI 700, a message 702 prompting a user to attach an external storage device for utilization during a forensic analysis of target computing device 704, according to various aspects of the present disclosure, is shown. GUI screen 700 may include a system prompt that requests user input. As illustrated, GUI screen 700 may provide a response prompt 702 to a user to connect a temporary storage device, such as the device shown in FIGS. 8-9, prior to allowing user to operate the forensic tool comprising a virtualization layer. In other aspects, virtualization media may comprise temporary storage device, and response prompt 702 may not be necessary. In another aspect, GUI screen 700 may prompt user to provide identification or security information, such as may be provided during step 610 of process 600, which may allow user to operate the virtual computer. A failure to provide the appropriate information may shut down target computing device operating system and prevent access to operating system of target computing device 704. As illustrated, target computing device 704 may comprise a disk drive 706 and a universal serial bus (USB) port 708. In other aspects, disk drive 706 may not be included on target computing device 704, which may limit media options for the write-protected virtual access system.

As will be appreciated by those skilled in the relevant art(s) after reading the description herein, in an aspect, various GUI screens will be generated by target computing device 704 in response to input from the user. In an aspect, such GUI would include screens to allow user to: (1) open folders; (2) open files; (3) search the computer databases; (4) run other computer programs needed for the investigative process; (5) perform any other actions needed by the user for the completion of the investigative process; (6) save files and folders to the temporary storage device; and (7) log out of the virtual machine environment once the user has completed their investigation.

Figure 8:
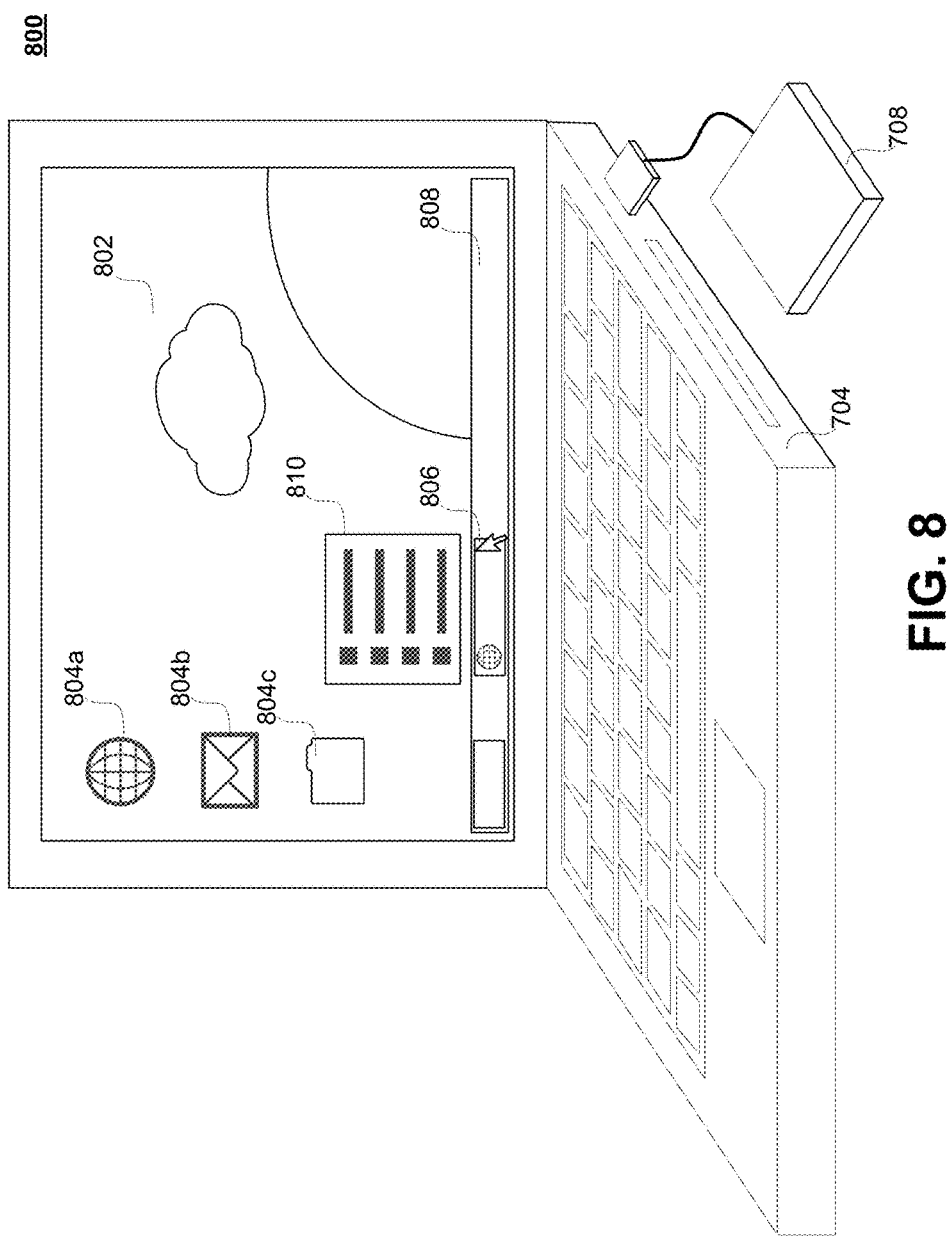
FIG. 8 is an illustration depicting a target computing device during a forensic analysis session, according to various aspects of the present disclosure.

Referring to FIG. 8, an illustration 800 depicting target computing device 704 during a forensic analysis session, according to various aspects of the present disclosure, is shown. Illustration 800 depicts an exemplary GUI for a desktop of the virtual machine environment that may be provided through process 200 operating on target computing device 704. In some aspects, the virtual machine environment may mimic the target computing device environment, wherein user may operate the virtual environment in the same or similar manner as user would the target computing device environment. For example, the virtual layout may display icons 804a, 804b, 804c and wallpaper 802 as they would appear on the target computing device environment. Traditional computer forensic techniques may not allow for such similar interfacing, and particularly may not allow user to view target computing device 704 as its owner last viewed it. For example, in the virtual machine environment, user may right click over an active internet bar 806 in a task bar 808 to view a browser history 812. A storage device 810 may comprise a temporary storage device that stores temporary files created during user operation of the virtual environment. In some aspects, a user may utilize a screen capture function, such as at step 616 in process 600, and select specific screen shots to store in storage device 810. Such captured screen images may be stored with an identifier, which, for example, may specify target computing device 704, related case number, date, or other pertinent information.

Referring to FIG. 9, an illustration 900 depicting target computing device 704 during a forensic analysis session, wherein a file 904 found on the target computing device 704 is accessed in a write-protected mode, according to various aspects of the present disclosure, is shown. Illustration 900 depicts an exemplary GUI for a desktop of the virtual machine environment that may be provided through process 200 operating on target computing device 704. Virtualization media allows user to operate the virtual machine environment in a write-protected format, wherein actions taken by user may not affect the contents of target computing device 704 while allowing a user to view, copy and perform other actions on target computing device 704 and data contained therein or accessible via target computing device 704. In some aspects, storage device 708 may log and document actions taken in such modes.

User may navigate through the virtual machine and the contents will match the files and programs in the equivalent folder on the hard drive of target computing device 704. User may open a folder by double clicking a folder icon 804*c* and select a specific document file 902 to read. User may view the document 904 in a write-protected format. In some aspects, user may input a selection to, for example, move, copy, open or save a file with limited risk of altering the original files.

In some aspects, the user may open a browser application. In such an aspect, the functionality and preferences of the browser application will be as though it was operating directly from the target computing device. The user can then input a selection to inspect, for example, recent searches performed through the browser application, websites identified as "favorites" or "bookmarked," and the chosen default settings for the browser application.

As will be apparent to one skilled in the relevant art(s) after reading the description herein, operations and processes shown in FIG. 8 and FIG. 9 or otherwise described herein may be configured for display and/or operation on any computer system, such as a set-top box, desktop, a laptop, a server, a tablet computer, a PDA, a mobile telephone, a mobile computer, an intelligent communication device, or the like.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way

What is claimed is:

1. A computer-implemented method for facilitating a write-protected access to a target computing device, the method comprising the steps of:

mounting, in a write-protected mode, a target computing device storage device of a target computing device, the target computing device storage device communicatively connected to a temporary storage device;

loading a virtualization layer, the virtualization layer utilizing the target computing device storage device to operate the target computing device as a virtual machine;

receiving an operation input from a user;

performing a write-protected action based on the operation input received from the user;

writing operation data to the temporary storage device, the operation data resulting from performing the write protected action on the target computing device;

mimicking, by the virtual machine, the target computing device;

resetting security measures on at least one of: the target computing device storage device and a target computing device operating system; and creating temporary passwords, the temporary passwords allowing access to at least one of: the target computing device storage device and the target computing device operating system.

2. The method of claim 1, wherein the mounting step further comprises verifying access to the temporary storage device.

3. The method of claim 1, further comprising the step of: shutting down a target computing device operating system.

4. The method of claim 1, wherein the temporary storage device comprises a forensic access tool, the forensic access tool comprising a virtualization layer module, the virtualization layer being loaded by the virtualization layer module.

5. The method of claim 1, further comprising the step of: booting the virtual machine to same condition as the target computing device.

6. The method of claim 1, further comprising the step of: verifying an access credential of at least one of: the user and the temporary storage device.

7. The method of claim 5, further comprising the step of: storing temporary files created during user operation of the virtual machine in the temporary storage device.

8. The method of claim 1, further comprising the step of: prompting the user to connect the temporary storage device.

9. The method of claim 1, further comprising the step of: bypassing security measures on at least one of: the target computing device storage device and a target computing device operating system.

10. The method of claim 5, wherein the condition includes at least one attribute of a plurality of attributes, the plurality of attributes comprising open browser pages, open programs with unsaved work, and open instant messaging conversations.

11. The method of claim 10, further comprising the steps of:

locking the condition of the target computing device;

restarting the target computing device; and preserving temporary data relevant to reestablishing the condition prior to restarting the target computing device.

12. The method of claim 11, wherein the locking is configured to prevent the target computing device from dumping temporary data necessary to replicate the condition during the restarting.

13. The method of claim 1, further comprising the steps of:

receiving a termination command;

terminating write-protected access; and locking the target computing device operating system.

14. The method of claim 1, further comprising the step of: creating a forensic image of the target computing device storage device on the temporary storage device.

15. The method of claim 1, further comprising the step of: altering, while the target computing device storage device is in the write-protected mode, contents of the target computing device storage device.

16. The method of claim 15, wherein the target computing device storage device is returned to its original state at the conclusion of a forensic investigation session.

17. A computer system for facilitating write-protected virtual access to a target computing device, comprising:
  a storage device capable of communicatively connecting to a target computing device, the storage device comprising a forensic access tool, the forensic access tool comprising:
    a mounting service configured to mount, in a write-protected mode, a target computing device storage device of the target computing device;
    a virtualization layer service configured to provide user access to the write-protected target computing device storage device via a target computing device input portion and a target computing device output portion and configured to establish a virtual machine on the target computing device wherein the virtual machine mimics the target computing device;
    a data gathering service configured to, in write-protected mode, record target computing device information on the storage device; and
  a security protocol bypass module configured to reset security measures on at least one of: the target computing device storage device and a target computing device operating system and to create temporary passwords, the temporary passwords allowing access to at least one of: the target computing device storage device and the target computing device operating system; and
  a temporary storage device connected to the target computing device storage device wherein operation data is written to the temporary storage device, the operation data results from performing a write protected action on the target computing device;
  wherein the write-protected action is performed based on operation input received from a user.

18. The computer system of claim 17, wherein the forensic access tool further comprises:
  a locking service configured to lock a condition of the target computing device, wherein the locking prevents the target computing device from dumping temporary data necessary to replicate the condition.

19. The computer system of claim 17, wherein the forensic access tool further comprises:
  a forensic copying service configured to create a forensic image of the target computing device storage device on the temporary storage device.

20. A computer readable storage device for storing computer readable instructions, the computer readable instructions facilitating write-protected virtual access to a target computing device, the computer readable instructions comprising:
  logic within a hardware logic component configured to mount, in a write-protected mode, a target computing device storage device of a target computing device, the target computing device storage device communicatively connected to a temporary storage device;
  logic within the hardware logic component configured to load a virtualization layer, the virtualization layer utilizing the target computing device storage device to establish a virtual machine on the target computing device;
  logic within the hardware logic component configured to receive an operation input from a user;
  logic within the hardware logic component configured to perform a write-protected action based on the operation input received from the user;
  logic within the hardware logic component configured to write operation data to the temporary storage device, the operation data resulting from performing the write protected action on the target computing device;
  logic within the hardware logic component to mimic by the virtual machine the target computing device;
  logic within the hardware logic component to reset a security measure on at least one of: the target computing device storage device and a target computing device operating system; and
  logic within the hardware logic component to create a temporary password, the temporary password allowing access to at least one of: the target computing device storage device and the target computing device operating system.

21. The computer readable storage device of claim 20, the computer readable instructions further comprising:
  logic within the hardware logic component configured to bypass security measures on at least one of: the target computing device storage device and a target computing device operating system.

22. The computer readable storage device of claim 20, the computer readable instructions further comprising:
  logic within the hardware logic component configured to reset security measures on at least one of: the target computing device storage device and a target computing device operating system; and
  logic within the hardware logic component configured to create temporary passwords, the temporary passwords allowing access to at least one of: the target computing device storage device and the target computing device operating system.

23. The computer readable storage device of claim 20, the computer readable instructions further comprising:
  logic within the hardware logic component configured to create a forensic image of the target computing device storage device on the temporary storage device.

24. The computer readable storage device of claim 20, the computer readable instructions further comprising:
  logic within the hardware logic component configured to boot the virtual machine to same condition as the target computing device.

25. The computer readable storage device of claim 24, the computer readable instructions further comprising:
  logic within the hardware logic component to store temporary files created during user operation of the virtual machine in the temporary storage device;
  wherein the target computing device storage device is returned to its original state at the conclusion of a forensic investigation session.

26. The computer readable storage device of claim 20, wherein the hardware logic component comprises one or more hardware logic components.

27. The computer readable storage device of claim 20, wherein the hardware logic component comprises at least one of a Field-programmable Gate Array, an Application- Specific Integrated Circuit, an Application-Specific Standard Product, a System-On-a-Chip System, and a Complex Programmable Logic Device.

\* \* \* \* \*